US010587716B2

(12) United States Patent
Don et al.

(10) Patent No.: US 10,587,716 B2
(45) Date of Patent: Mar. 10, 2020

(54) SYSTEMS AND METHODS FOR OPTIMIZING ALLOCATION OF BANDWIDTH FOR PRE-CACHING MEDIA CONTENT

(71) Applicant: Rovi Guides, Inc., San Carlos, CA (US)

(72) Inventors: Luis Don, Lumberton, NJ (US); Peter Jason Calvert, Limerick, PA (US); David Paul Steed, Pottstown, PA (US)

(73) Assignee: Rovi Guides, Inc., San Jose, CA (US)

( * ) Notice: Subject to any disclaimer, the term of this patent is extended or adjusted under 35 U.S.C. 154(b) by 132 days.

(21) Appl. No.: 15/794,532

(22) Filed: Oct. 26, 2017

(65) Prior Publication Data

US 2019/0132413 A1    May 2, 2019

(51) Int. Cl.
| | | |
|---|---|---|
| *H04L 29/08* | (2006.01) | |
| *H04N 21/262* | (2011.01) | |
| *H04N 21/442* | (2011.01) | |
| *H04L 12/26* | (2006.01) | |

(52) U.S. Cl.
CPC .......... *H04L 67/2847* (2013.01); *H04L 67/22* (2013.01); *H04N 21/26216* (2013.01); *H04N 21/44209* (2013.01); *H04L 43/0882* (2013.01)

(58) Field of Classification Search
CPC . H04L 67/2847; H04L 67/22; H04L 43/0882; H04N 21/24; H04N 21/2402; H04N 21/262; H04N 21/26208; H04N 21/26216; H04N 21/442; H04N 21/44209; H04N 21/44213; H04N 21/44218; H04N 21/44227
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,007,090 B1* | 2/2006 | Spangler | H04L 41/0896 709/223 |
| 7,165,098 B1 | 1/2007 | Boyer et al. | |
| 7,417,992 B2* | 8/2008 | Krishnan | H04J 3/1682 370/235 |
| 7,437,438 B2* | 10/2008 | Mogul | G06F 16/9574 709/223 |
| 7,761,892 B2 | 7/2010 | Ellis et al. | |
| 7,983,272 B2* | 7/2011 | Carlson | H04L 12/2801 370/395.4 |
| 8,046,801 B2 | 10/2011 | Ellis et al. | |
| 8,117,303 B2* | 2/2012 | Fonsen | H04W 60/06 709/224 |

(Continued)

OTHER PUBLICATIONS

International Search Report and Written Opinion dated Oct. 16, 2018 in PCT/US2018/039922.

*Primary Examiner* — James R Sheleheda
(74) *Attorney, Agent, or Firm* — Haley Guiliano LLP

(57) ABSTRACT

Systems and methods for optimizing network use for downloading media assets using activity signals for a household or organization. A receiver may monitor an organization for signals indicating activities that are associated with a reduction in use of the network. When such signals are received, a media guidance application may automatically download a media asset during a period of reduced network use.

20 Claims, 8 Drawing Sheets

(56) References Cited

U.S. PATENT DOCUMENTS

| | | | |
|---|---|---|---|
| 8,713,607 B2* | 4/2014 | McEnroe | H04N 7/163 725/41 |
| 8,819,303 B2* | 8/2014 | Venugopal | H04L 12/1435 710/18 |
| 8,892,720 B2* | 11/2014 | Diaz | H04L 12/40013 709/218 |
| 9,058,324 B2* | 6/2015 | Kohlenberg | H04W 4/029 |
| 9,641,791 B2* | 5/2017 | Tozer | H04N 21/4334 |
| 10,218,811 B1* | 2/2019 | Demsey | H04L 67/2847 |
| 2002/0174430 A1 | 11/2002 | Ellis et al. | |
| 2003/0101060 A1 | 5/2003 | Bickley et al. | |
| 2004/0268407 A1* | 12/2004 | Sparrell | G06F 1/266 725/116 |
| 2005/0055426 A1* | 3/2005 | Smith | H04L 67/2847 709/219 |
| 2005/0251827 A1 | 11/2005 | Ellis et al. | |
| 2006/0047775 A1 | 3/2006 | Bruck et al. | |
| 2007/0058924 A1* | 3/2007 | Yeh | G11B 27/105 386/237 |
| 2007/0204011 A1 | 8/2007 | Shaver et al. | |
| 2008/0151817 A1* | 6/2008 | Fitchett | H04W 28/20 370/329 |
| 2008/0192820 A1* | 8/2008 | Brooks | H04N 7/17318 375/240.02 |
| 2008/0235360 A1* | 9/2008 | Li | G06F 16/9574 709/223 |
| 2008/0275984 A1* | 11/2008 | Ullmann | H04L 41/0213 709/224 |
| 2009/0094248 A1* | 4/2009 | Petersen | H04L 51/26 |
| 2009/0193485 A1* | 7/2009 | Rieger | H04N 21/2402 725/114 |
| 2010/0015926 A1 | 1/2010 | Luff | |
| 2010/0153885 A1 | 6/2010 | Yates | |
| 2010/0161831 A1* | 6/2010 | Haas | G06F 15/173 709/235 |
| 2010/0198822 A1* | 8/2010 | Glennon | G06F 3/0482 707/728 |
| 2011/0040718 A1* | 2/2011 | Tendjoukian | H04L 67/2847 706/52 |
| 2011/0055413 A1* | 3/2011 | Lobsenz | G06Q 10/06 709/231 |
| 2011/0060808 A1* | 3/2011 | Martin | G06F 16/9537 709/217 |
| 2011/0296046 A1* | 12/2011 | Arya | H04L 65/602 709/231 |
| 2011/0299544 A1* | 12/2011 | Lundgren | G06Q 20/10 370/401 |
| 2012/0023226 A1* | 1/2012 | Petersen | H04W 4/18 709/224 |
| 2012/0131623 A1* | 5/2012 | McDysan | H04N 21/2402 725/97 |
| 2012/0192234 A1* | 7/2012 | Britt | H04N 5/782 725/58 |
| 2014/0019443 A1 | 1/2014 | Golshan | |
| 2014/0095943 A1* | 4/2014 | Kohlenberg | H04W 4/029 714/47.3 |
| 2014/0379835 A1* | 12/2014 | Foerster | H04L 67/2847 709/213 |
| 2015/0249803 A1* | 9/2015 | Tozer | H04N 21/4334 386/293 |
| 2015/0319494 A1* | 11/2015 | Dhanabalan | H04N 21/4583 386/293 |
| 2015/0382029 A1* | 12/2015 | Klappert | H04N 21/23109 725/39 |
| 2016/0014194 A1* | 1/2016 | Kaplinger | H04L 67/06 709/217 |
| 2016/0014554 A1 | 1/2016 | Sen et al. | |
| 2016/0119404 A1* | 4/2016 | Bowen | G06Q 10/0631 709/217 |
| 2016/0234078 A1 | 8/2016 | Jana et al. | |
| 2016/0309228 A1* | 10/2016 | Alexander | H04N 5/775 |
| 2017/0019307 A1* | 1/2017 | Brooks | H04N 7/1675 |
| 2017/0140285 A1* | 5/2017 | Dotan-Cohen | G06N 5/048 |
| 2017/0331752 A1* | 11/2017 | Jana | H04L 67/02 |
| 2018/0007437 A1* | 1/2018 | Jin | H04N 21/4583 |
| 2018/0027270 A1* | 1/2018 | Wallters | H04N 21/2402 725/96 |
| 2018/0124143 A1* | 5/2018 | Bologh | H04N 21/26216 |
| 2019/0028357 A1* | 1/2019 | Kokkula | H04L 41/145 |
| 2019/0037359 A1* | 1/2019 | Begeja | H04L 65/4076 |
| 2019/0132413 A1* | 5/2019 | Don | H04L 67/2847 |
| 2019/0190848 A1* | 6/2019 | Zavesky | H04L 47/805 |

\* cited by examiner

SYSTEMS AND METHODS FOR OPTIMIZING ALLOCATION OF BANDWIDTH FOR PRE-CACHING MEDIA CONTENT

BACKGROUND

Internet capacity can sometimes be inadequate to support media consumption for a household or organization. At times of heavy network use, media delivery may be delayed or intermittently displayed while buffering or updates are received. Such delivery may be frustrating for a user. One way this is handled is by using download queues which perform downloads in order based on network availability. This requires a user to wait, in the moment, for delivery of requested media or data.

SUMMARY

Accordingly, systems and methods are provided for optimizing allocation of network bandwidth for pre-caching a media asset using signals that indicate that network capacity may be available. In particular, a media guidance application may pre-cache media content at a time when a household or organization experiences a temporary lull in network use. The lull in network use may be predicted based on a received signal originating from the household or organization associated with the network. For example, a receiver, such as a home monitor, may monitor household sounds for instructions to perform some operation. The sounds may be recorded, along with a respective time, and then compared to a network capacity log which may yield information about changes in network use around the time a particular sound is received.

In an example for a household, a family may have an Internet service that delivers 100 Mbps to the home network. The family may have relatively high network use, approximately 80 Mbps in the early evening when everyone has returned home. For example, one member of the family may view cooking videos or online recipes while preparing dinner, while at the same time, another member of the household may be accessing homework related media. Yet another member of the household may be watching a news broadcast, and another member of the household may be streaming media. Later in the evening, members of the household may continue to be streaming media, accessing homework related media, shopping online, or using other network based applications so that their bandwidth use is approaching 80-90 Mbps. When each member of the family is using a network-based resource at the same time, there may be delivery delays or network problems.

When the members of the household sit down for dinner, however, they may set down their media devices temporarily, causing network demand to lessen. Sometimes, the change in network use can be significant. For example, the household network use can go from 80 Mbps a few minutes before dinner, to 60 Mbps when one member of the household stops using a media device and sets dishes on the table. And then when all of the members of the household sit down for dinner, the use of the network may fall to 10 Mbps or some other low use number. Identifying that period when the network use is reduced can be achieved by monitoring the household. A home monitoring device may receive a signal that dinner is about to begin from, for example, a sound of a chair being pulled away from a table, or the sound of dishes and silverware being set on at table, a spoken statement: "dinner's ready!", or other sound. Analyzing such household sound information with network capacity logs may identify certain types of sounds that precede network availability. In some examples, network use patterns may be analyzed using a network usage report from a network provider, such as an internet usage report from an Internet service provider.

In an example, an interactive media guidance application may receive an indication of interest in a media asset at a future time. The interest in the media asset may be obtained in a number of ways. For example, a user may request a media asset, a user may bookmark a media asset having a future broadcast or availability time, or a user may indicate on social media that they are interested in a media asset that is associated with a future time. In another example, the media guidance application may determine that a user has viewed multiple episodes of a series recently in the evening, and that several episodes remain unwatched. The media guidance application may select any number of the unwatched episodes as being of interest. In another example, the media guidance application may identify that application updates or software updates may be available for devices on the network. In another example, the media guidance application may access a user preference profile and identify a repeating pattern of viewing by the user for a media asset that has periodic content updates, for example, a newspaper evening update. If the media guidance application determines that the user frequently downloads an evening update that is available at a time adjacent to heavy network use, it would be helpful to identify a slow period for network use to automatically download some or all of the update.

After the media guidance application has received some indication of a media asset for a future time, the media guidance application may predict a capacity of the network for receiving the media asset at the future time. For example, the capacity of the network at the future time may be 20 Mbps in a 100 Mbps network because members of the household are predicted to use 80 Mbps at the future time. The prediction may be based on an analysis of historical data for the network. For example, network usage may be logged over time for each operation performed over the network—uploads, downloads, etc., including information about time of use, data transferred, source, destination, users, and other information. Such data may be processed to determine average use for specific days and particular time periods, use by certain devices or users, etc. The capacity of the network may be predicted using historical use data for the network at a time related to the future time, for example, on a prior Wednesday or on a prior weeknight at 6:00 pm, or other time. An average capacity of the network may be calculated for that prior time increment that is related to the future time of the media.

The media guidance application may also calculate an expected volume of data for downloading the media asset. The calculation may be based on historic average data transfers for a news update, for example, or by referring to the metadata for the media asset to obtain content data information. The media guidance application may determine that the volume of data for the media asset may exceed the predicted network capacity. For example, the media guidance application may determine that streaming an episode of a recently viewed series may have a data volume that exceeds the predicted network capacity in the early evening. In this scenario, the media guidance application may seek to find an opportunity to pre-cache some of the media during a period of low network use.

A receiver may be used to monitor an organization associated with the network. The receiver may be part of user equipment that is associated with the media guidance application, or a receiver device that can be connected over a network to other devices in the organization. Some examples of a receiver are Amazon Echo and Google Home. A home monitoring device such as Canary, Nest and Angee may also provide monitoring data for a home or organization that can be used by the media guidance application. The organization may be a household for a home Internet network, a company with a corporate network, a hotel or resort with an Internet service for guests, a community facility, or other group sharing a data network. The receiver may monitor audio data or other signals, such as user inputs into the receiver as digital signals, and video signals from a video monitor to collect organizational information. Such information may be stored with time details for the signals and activity.

Signals received by the receiver may be analyzed and compared to network data logs to identify signals preceding a downturn in network usage. The receiver may detect a signal which indicates that a member of the organization is performing an activity. A signal indicating performance of an activity may be for example, a sound that members of the household are gathering for a meal, a user pressing pause on a household device, some user equipment, the media guidance application, a sound of a piano lid coming down, or other signal.

The media guidance application may determine that the activity indicated by the signal is associated with a reduction in use of the network. This determination may be found by comparing historic signal information and network use logs to identify signals that precede a reduction in network use. The media guidance application may predict a time period for the activity based on historic activity data. Historic activity data may be data collected by the receiver and which comprises data indicating an activity signal and a time associated with the signal. For example, historic activity data which may be used to identify a signal that precedes a change in network usage, together with the network use data logs, can also provide insight into the period of time following the signal in which network use is reduced.

In some examples, the media guidance application may analyze history activity data and network data logs to identify a time pattern of network availability based on the audio, video or digital signals. In other words, the media guidance application may identify audio, video or digital signals that precede a reduction in network use. The media guidance application may store those signals in a database associated with a characteristic of leading to decreased network use. The signals may also be associated with information about a respective average time period of reduced network use. In its analysis of history activity data and network data logs, the media guidance application may identify certain patterns of consistent times of availability. Such patterns of network availability can be used to schedule downloads of media assets such that the downloads begin automatically upon receipt of the activity signal by the receiver.

In an example for a household having dinner, there may be an associated time pattern for the typical dinner correlates with approximately one hour or reduced network use. The activity signals for such a dinner may be associated with the one hour time period. Additional activity signals for a dinner may include additional voices, or more plates being set, and which may indicate that a larger dinner is to commence or is underway, and which may be associated with a longer period of reduced network use, for example, two hours. In addition, comparison of the time with a calendar may add additional time factors for weekend meals, which may add an additional thirty minutes to a predicted dinner length, and correspondingly, an additional thirty minutes of reduced network use. The media guidance application may also determine that it is a holiday, or near a holiday, which may increase a dinner time to three hours in length and correspondingly, three hours of reduced network use.

The media guidance application may determine network availability during the predicted time period for the activity using historical use data for the network. In general, when the network availability during the predicted time period is sufficient to download the media asset, the media asset, or some portion of the media asset may be downloaded to memory during the predicted time period and prior to the future time. For example, when a sound of dishes clattering indicates a dish washing activity, there may be a prediction that the dish sound may be for an activity that takes approximately fifteen minutes, and during that time, using historical use data following prior occurrences of the sound, there may be a determination of the network capacity. If there is available network capacity, the media guidance application may schedule a download or pre-cache of the media asset identified to be of interest (i.e., the new update, or the unwatched episode, etc.) during the activity time in advance of the future delivery or demand time. In another example, the media guidance application may determine that the bandwidth volume for the media asset download is substantially near the network availability. In this case, the media guidance application may pre-cache to memory only a portion of the media asset in advance of the future time. Downloading only a portion may serve to avoid a problem with an interrupted download.

In some scenarios, the media guidance application may determine that the available network capacity during the predicted time period is insufficient to download or pre-cache the media asset because the bandwidth needed for the download may exceed the network capacity. In this case, the media guidance application may receive a second indication of interest in a second media asset for a future time and determine whether the second media asset can be pre-cached. For example, the media guidance application may receive information about a user or more than one user of a network indicating interest in media assets that is available at a time of relatively high network use. In order to balance use of the network, the media guidance application may pre-cache or download one or more of the media assets in advance of the high network use time during which it is sought. The media guidance application may determine a bandwidth volume for the media assets and if there is adequate network capacity for the second media asset, it may be pre-cached, and the first media asset may be delivered at the future time. Variations of this scenario could include that parts of one or both of the media assets could be pre-cached, etc.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
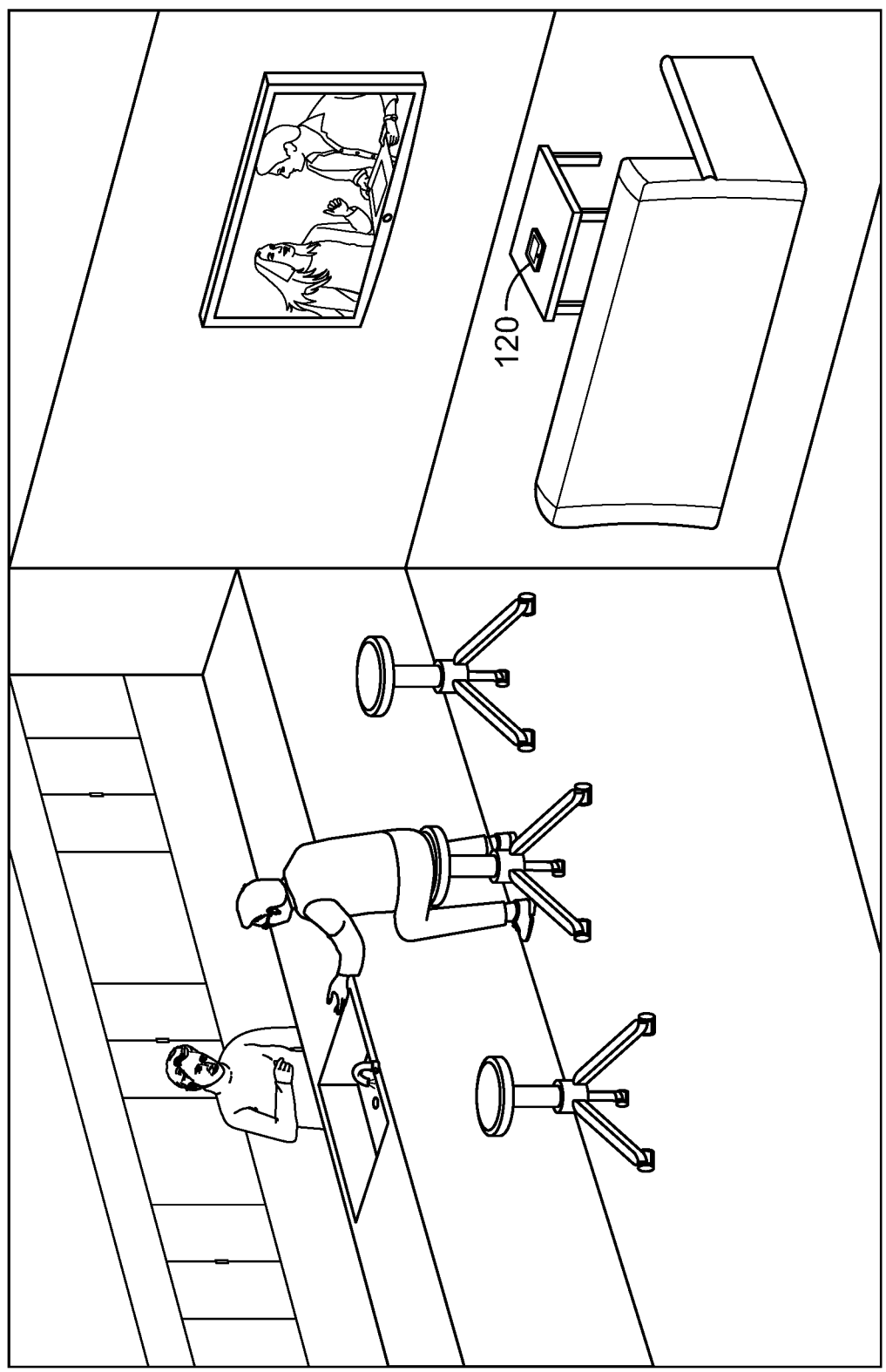
FIG. 1 shows an illustrative example of a setting in which pre-caching or downloading of a media asset may be optimized in accordance with some embodiments of the disclosure.

Systems and methods are described for optimizing allocation of network bandwidth for pre-caching or downloading media assets using a signal that indicates that network capacity may be available or may be available soon. Sometimes in a household or organization, network capacity is not always sufficient for the needs of the members of the household or organization. To avoid interruptions or delays in delivery media content, a media guidance application may pre-cache media content at a time when a household or organization experiences a temporary lull in network use. For example, a household may have a home Internet network service that provides 100 Mbps. When all of the members of the household are home in the evening, each may be using the network on a media device. For example, one member of the household may view a streaming news service, while at the same time, another member of the household may be viewing streaming television episodes, and yet another member of the household may be accessing homework related applications, etc. Such behavior may continue throughout the evening for each member of the household using various devices and accessing different types of media assets. Some high definition content or interactive games require a high volume of bandwidth—when used/viewed at the same time, and network performance can be affected. When some or all members of the household sit down for dinner, they may put away their media devices and temporarily stop accessing the network based content. During dinner time, the use of the network may drop from a high of 70-80 Mbps of traffic prior to dinner to a lower rate of use, for example, 10 Mbps. Thus, while the members of the household are eating dinner, there may be a lull in network use, during which time, application updates and media downloads can be performed to avoid straining network capacity later in the evening when the members of the household have finished eating and are relaxing and watching television and viewing other network-based applications.

Pre-caching a media asset may commence with the media guidance application receiving an indication of interest in a media asset that has an associated future time. The media guidance application may determine that the future time is one in which network capacity is relatively high and so the media guidance application may seek an alternative time to pre-cache the media asset.

A receiver device that is in communication with the media guidance application may be used to monitor an organization or household for signals. The signals received by the receiver may be processed by the media guidance application in a number of ways for different purposes. For example, some receivers are capable of receiving voice commands from a user to perform some action. The receiver may continuously or periodically monitor the household or organization to collect signals. The signal information can be analyzed by the media guidance application for signal characteristics and an associated time of the signal can be used to compare with a network log to identify any signals that precede a change in network use. For example, a sound of dishes being set out may precede a meal time, which may coincide with reduced network use. In another example, a sound of dishes and water from a tap (from washing dishes) may precede a period of low to medium network use followed by a period of increased network use. In another example, the sound of dog tags, barking and tapping claws may precede a period of low network use when a member of the household takes a dog for a walk.

In order for the media guidance application to find a suitable time to pre-cache the media asset, the media guidance application may listen for signals from the receiver that indicate an activity is commencing. In some embodiments, signals may be received from a receiver that is a listening device such as an Amazon Echo or a Nest Cam. When the activity is determined to be one of lower network use, the media guidance application may predict a time for the activity and determine a bandwidth volume needed for downloading the media asset. If a signal is received that indicates an activity is starting and network capacity will become available, the media guidance application may automatically download the media asset during the activity period prior to the future time associated with the media asset.

FIG. 1 shows an illustrative setting for performing network optimization. As shown, a great room in a house may include an open plan kitchen with bar or dining area and a living room or TV room. A receiver 120 may be placed on a coffee table to receive instructions from members of the household. The receiver 120 may be one that is always listening for audio cues. In the example in FIG. 1, the receiver 120 may hear, for example, sounds of the bar stools moving in the kitchen, dishes being taken out of the cabinets, water running in the sink, pots moving while cooking, emptying a garbage container, or other kitchen noises. Each of these sounds may be associated with an activity that leads to a change in network use. In addition, the receiver 120 may hear sounds of members of the household walking into the house, near the television, or other sounds. The receiver may be one that provides different types of household functions, such as Amazon Echo, Google Home, Canary, Nest or Angee. Some of these types of receivers provide video monitoring and the video signals may be used and analyzed in the same manner as the audio and digital signals discussed herein.

The receiver 120 may be a single device or it may be multiple devices placed in different locations within a household or organization. The receiver 120 is connected to a network (e.g., a home LAN) so that it can communicate with user equipment, a media guidance application and other household devices. The receiver 120 may optionally include processing circuitry, storage, a user interface, a display and speakers. Receiver 120 may also operate in conjunction with a remote computer or processor. Generally speaking, the receiver 120 is used to receive signals that can be audio signals overheard within the household, video signals of images seen within the household, or digital signals from a user input into the receiver 120. The receiver 120 may communicate the signals to the media guidance application or a controller for performing additional analysis and operations.

In the household or organization, network use may follow some patterns. As shown in illustrative FIG. 2, network use over time 210 has varying data use 220. An illustrative network bandwidth limit is shown as 215, which may correspond to a maximum available network service, e.g. in a household 100 Mbps. Network use may vary over time. For example, network use is very low during a period in which members of a household are sleeping, i.e., 11:00 pm to 6:00 am. Starting around 6:00 am, network use increases, perhaps a member of the household has woken up and downloaded newspapers or other media assets, and then network use decreases temporarily at 230, beginning approximately at 6:45 am.

At the time 230, perhaps the awake members of the household are taking showers or preparing breakfast in a time interval 245 of reduced network use. Following the time interval 245, a morning peak network use follows at 240 at approximately 7:30 am. During the time interval 247, network traffic exceeds the network service bandwidth 215. During the time interval 247, all of the members of the household may be accessing network devices, e.g., downloading emails, downloading media to consume during a commute, uploading homework or projects, or other network uses. Since the network traffic exceeds the available bandwidth 215, each of the network operations may be slower or delayed. If one or more of the network operations occurring in the time interval 247 could be shifted to the reduced network use period 230, or to the period following the time interval 247, the network use would be allocated more evenly and ideally to a level below the maximum capacity 215 so that other network users do not have any delivery delays or interruptions.

The network use decreases after 9:00 am when, for example, members of the household have left for the day. Network use remains low over the rest of the morning until about 3:00 pm, perhaps when children of the household return home from school. Network use increases again after 6:00 pm at approximately 260, perhaps when all of the members of the household have returned home for the day. A short lull in network use appears at 270 around 7:00-8:00 pm (time period 265) before increasing again and fluctuating over the evening hours. The lull period 265 may coincide, for example, with a period where members of the household are eating dinner and cleaning up after dinner. Network use may increase again following the lull period 265 at approximately 8:30 pm, when, for example, members of the household may be streaming television episodes, playing online video games, accessing work projects, accessing homework related applications, and other network uses. During a time period 275, there may be more network data uses than the network has bandwidth. Shifting some media asset downloads for period 275 to the reduced network use period 265 can help alleviate delays and interruptions in user media operations.

Network use information can indicate data and bandwidth use at a particular time. In addition, a network log may include details (not shown) about the type of network use, the user using the network, sources and destinations of use, numbers of devices connected to the network, and other network information.

Figure 3:
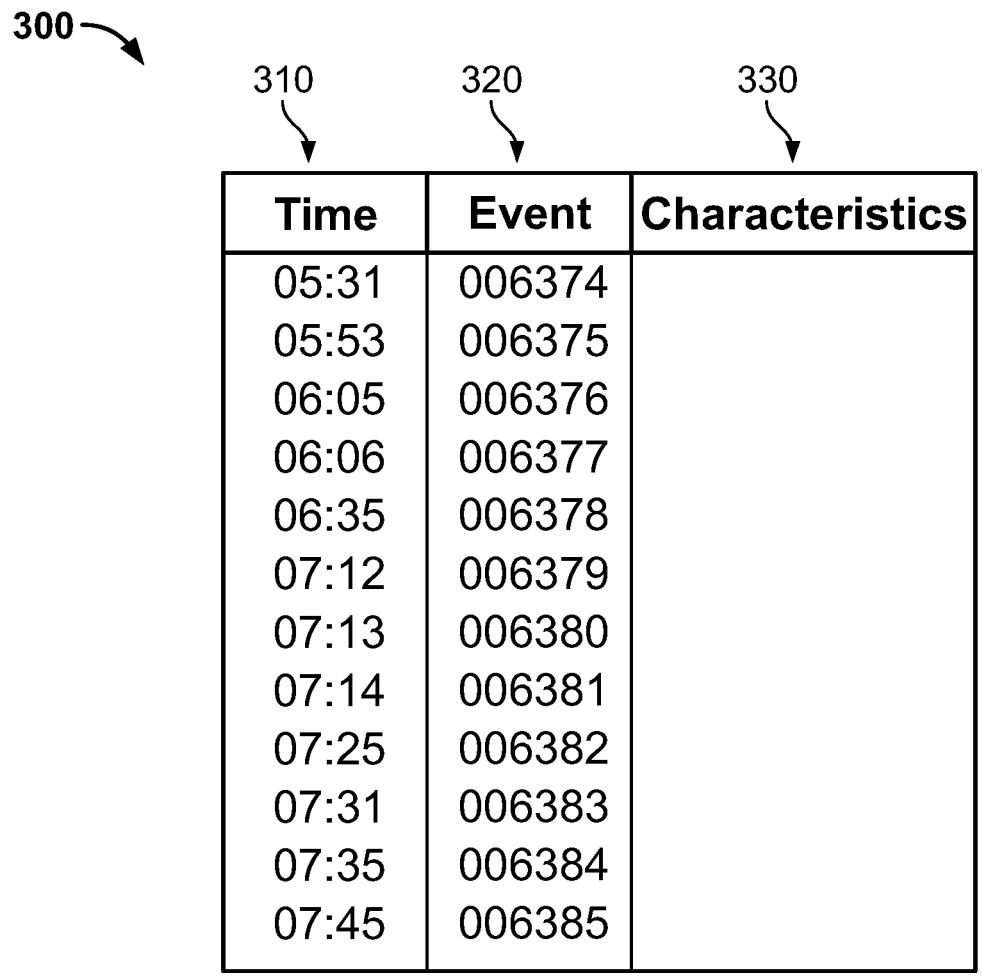
FIG. 3 shows an illustrative example of a signal log in accordance with some embodiments of the disclosure.

Analyzing the network log details together with an activity signal log for an organization sharing the network can yield information about how and when networks are being used. Turning to FIG. 3, an activity signal log 300 may be used to record signals monitored by a receiver. The receiver may be any monitoring device capable of receiving and recording audio and digital signals, such as receiver 120 (FIG. 1). The receiver may be stationary or mobile in a household, office, warehouse, or other space and be in audio, visual or communication range of members of the organization. As shown in the signal log 300, time 310 information, and signal events 320 may be recorded in a log. The monitoring may be performed continuously, periodically, or based on a threshold trigger. For example, the monitoring receiver may only record an event that exceeds a baseline. The signal log 300 may optionally include additional characteristics 330 about the signal event 320, including, for example, information about the type of signal, a source of the signal, or other information.

The media guidance application may analyze the signal activity log and the network use log and compare time details for network use and the signals in order to identify signals or signal events that precede a change in network use. For example, a receiver may detect a tap and water sound at 6:15 am when a member of a household is taking a shower, which correlates with a decrease in network use at the time. The tap and water sound signal may be identified by the media guidance application using a historic log of signals received for the household. In some scenarios, the sound signals may be identified by the media guidance application by searching a database of audible sounds to find a matching sound. Similarly, the receiver may detect a sound of the shower being turned off, which precedes another change in network use. The sound of the water being turned off may be identified by the media guidance application from an activity log for the household, or by searching a database of audible sounds.

The media guidance application may extrapolate from the signal log and the network use log, an average time from the signal for the change in network use. In an example, at a time preceding the lull period 270, there may be sounds of a member of the household setting dishes on a table or cooking. Those sounds may be heard by a receiver and identified as activity signals. In another example, the media guidance application may have access to a database of signals, e.g., for audible sounds which may be used to identify sounds heard in the household. The database may also include characteristics for the sounds that are related to duration of activities following the sound. The database of information can be obtained from various sources, including aggregated data from multiple households having such receiver devices.

The activity signals and associated time information can be used by the media guidance application to identify and predict periods of time when network use may be reduced. When multiple members of a household are using a home network simultaneously, the network capacity may be reached, and media asset delivery may be intermittent or delayed. If the media guidance application can identify media assets of interest, particularly ones that may be available at times of high network use, and then pre-cache the media content in the periods of reduced network use, the members of the household will have fewer incidence of network throughput problems. For example, if there is typically high network use during the period 7:00-8:00 am, and the media guidance application can identify a media asset of interest to a member of the household, e.g., a morning news update, or software update, that will typically be accessed during the high network use period, the media guidance application can pre-cache media content at 6:30 am when the media guidance application receives a signal that a member of the household is starting the shower, and there will be a predicted ten minute period of lower network use during the shower time.

The systems and methods may be implemented via an interactive media guidance application running on a user device, a remote server, or another suitable device. The interactive media guidance application may be implemented partially on multiple devices such that some portions of the interactive media guidance application are executed on one device while other portions of the interactive media guidance application are executed on another device.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
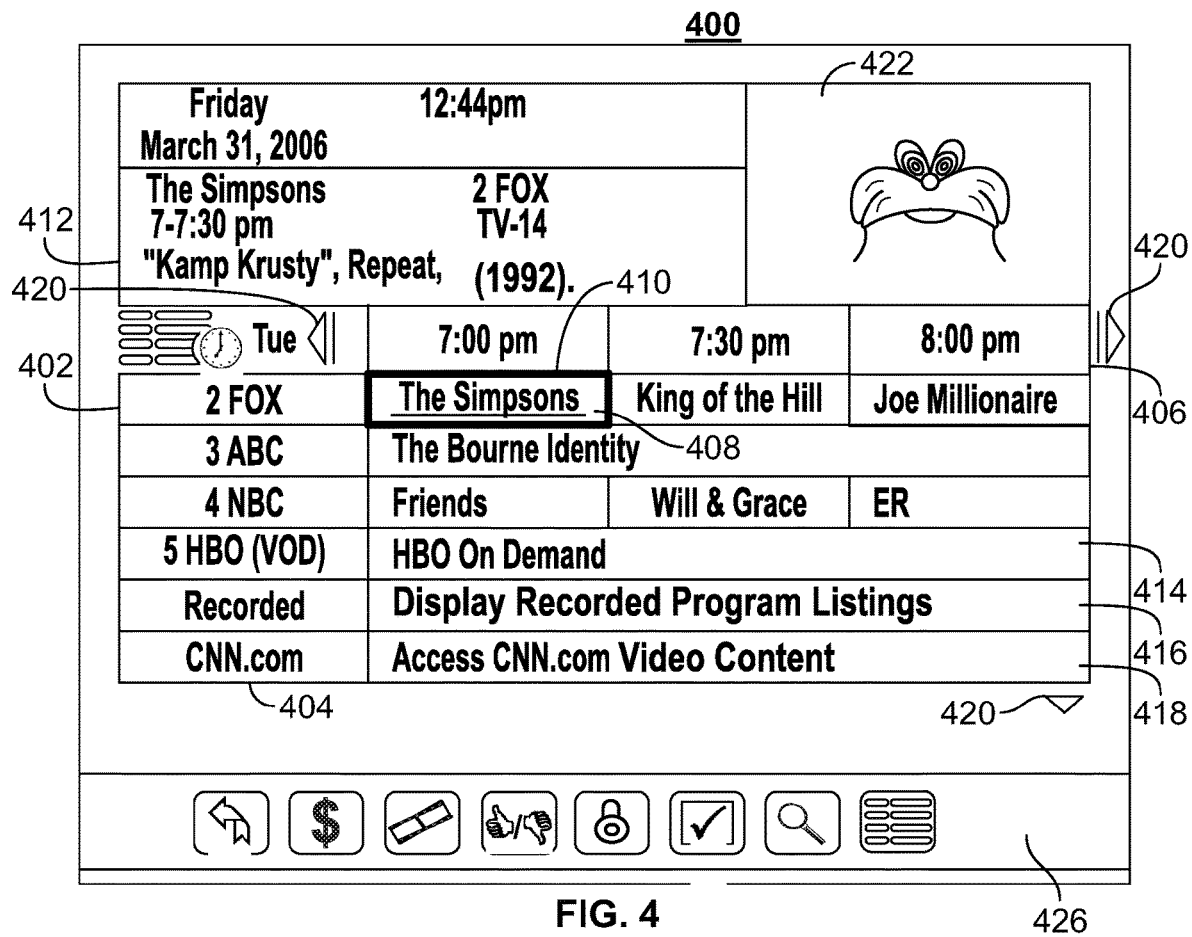
FIGS. 4-5 show other illustrative examples of display screens generated by a media guidance application in accordance with some embodiments of the disclosure.
Figure 5:
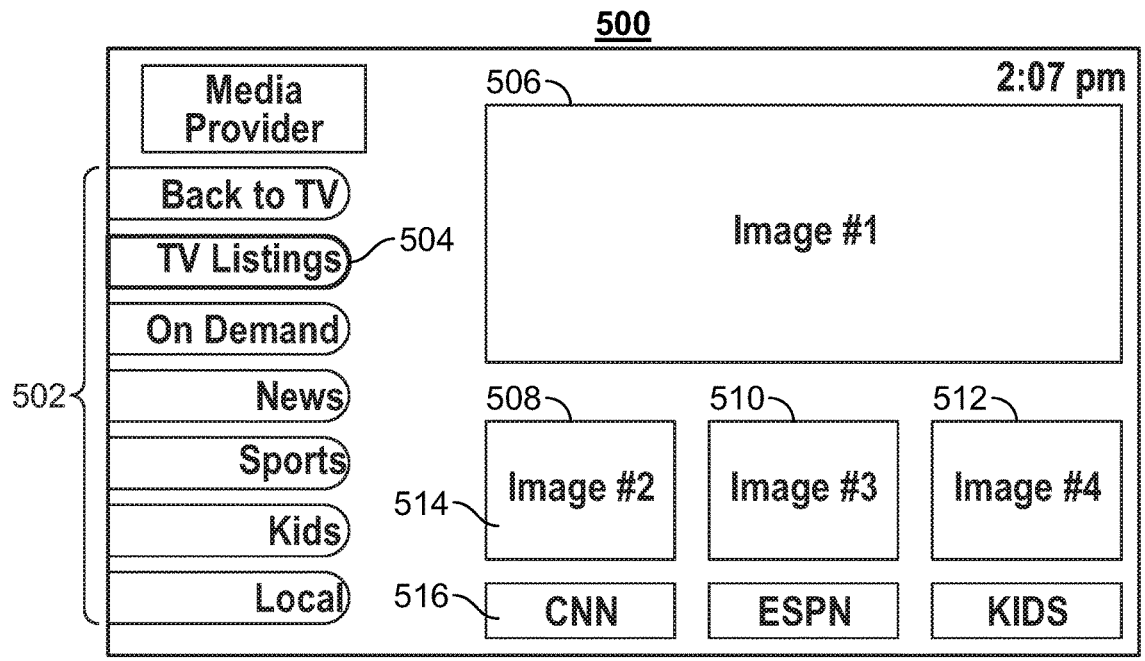

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
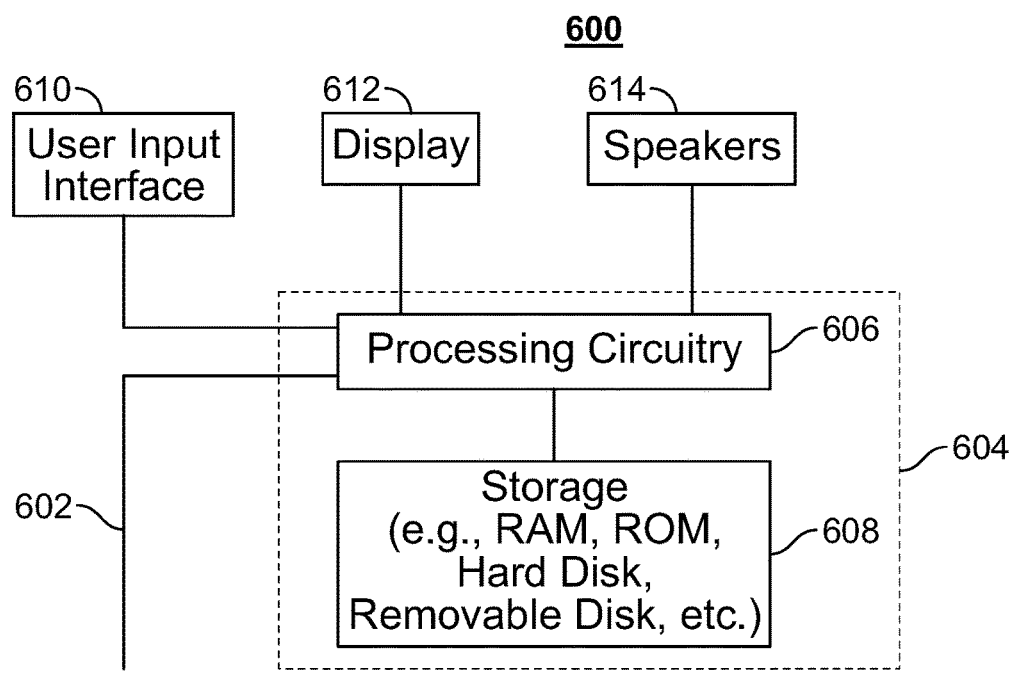
FIG. 6 is a block diagram of an illustrative user equipment device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
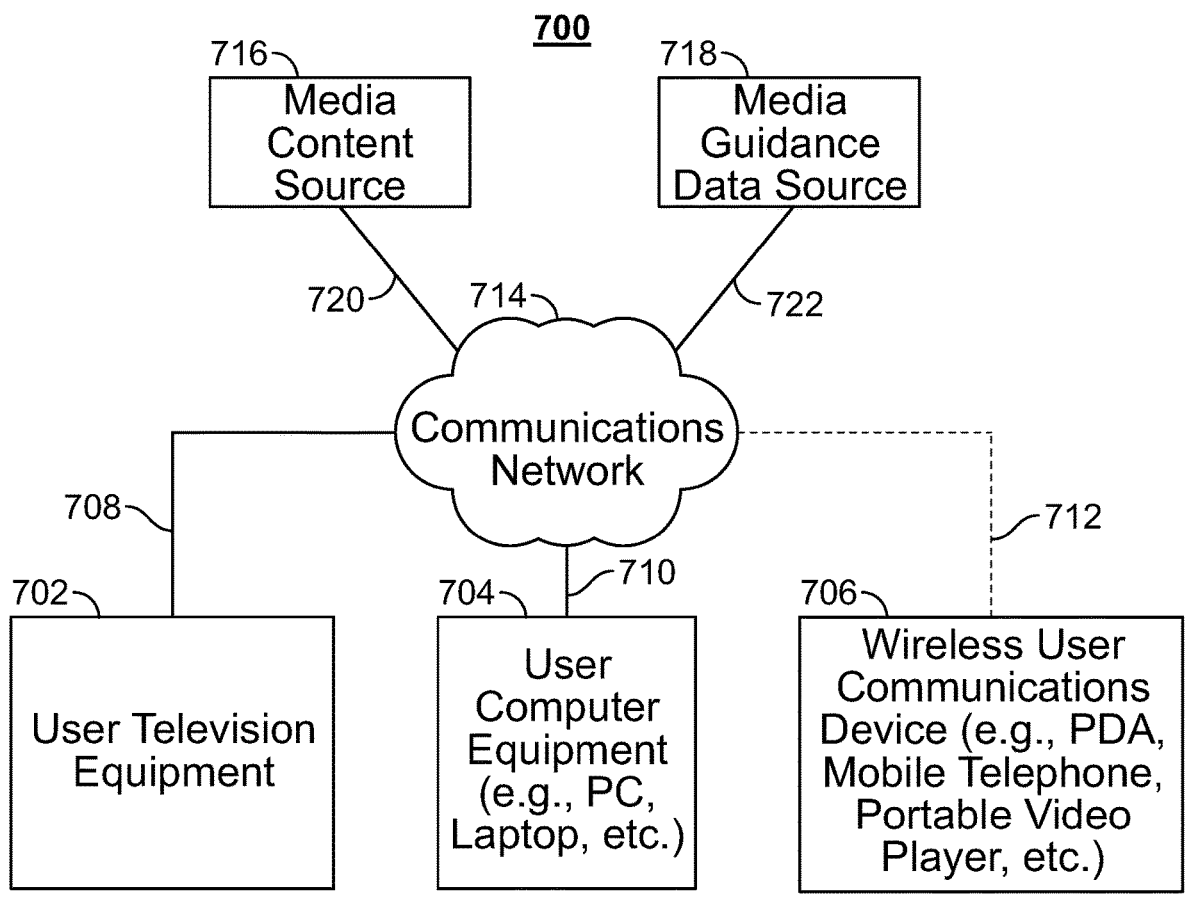
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
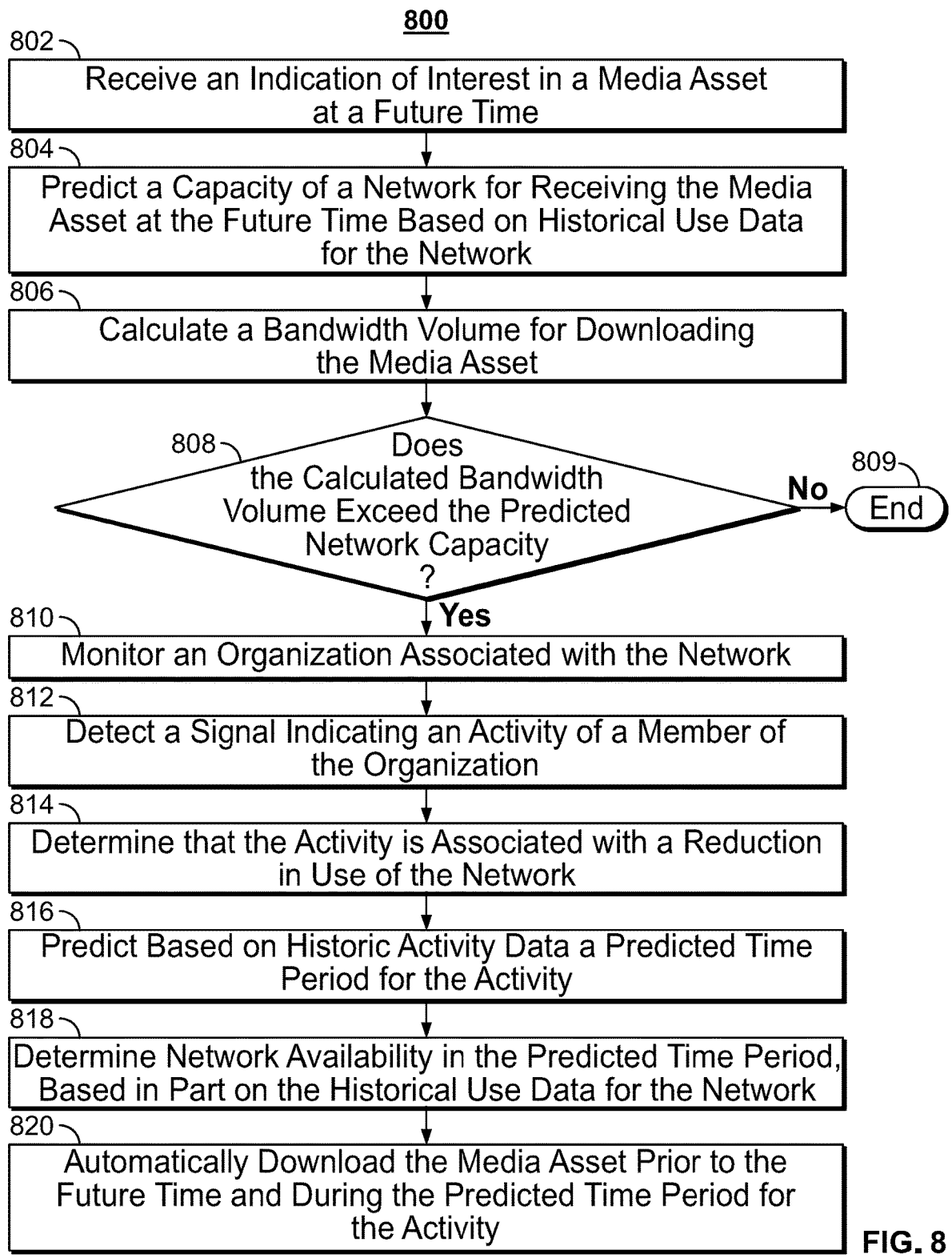
FIG. 8 is a flowchart of an illustrative process for optimizing network use by pre-caching a media asset in accordance with some embodiments of the disclosure.

Optimizing network bandwidth for downloading or pre-caching media assets may be performed using a media guidance application following the steps 800 of FIG. 8. FIG. 8 is a flowchart of illustrative steps of a process 800 for automatically downloading a media asset in accordance with some embodiments of the disclosure. It should be noted that process 800 or any step thereof could be performed on, or provided by, any of the devices shown in FIGS. 6-7. For example, process 800 may be executed by control circuitry 604 (FIG. 6) as instructed by a media guidance application implemented on a user device (e.g., user equipment devices 702, 704, and/or 706 (FIG. 7)) in order to pre-cache media assets. In addition, one or more steps of process 800 may be incorporated into or combined with one or more steps of any other process or embodiment described herein.

A step 802, an indication of interest in a media asset at a future time is received by the media guidance application. The media guidance application can receive the indication of interest in several ways. In one example, the media guidance application can receive a user request for a particular media asset, such as a streaming television show, a movie on demand, an update to a stock exchange at a closing time, a newspaper update, or other user request for media content. In another example, the media guidance application may use a user preference profile stored in memory to identify media of interest to the user that the user may wish to receive at a future time.

Figure 2:
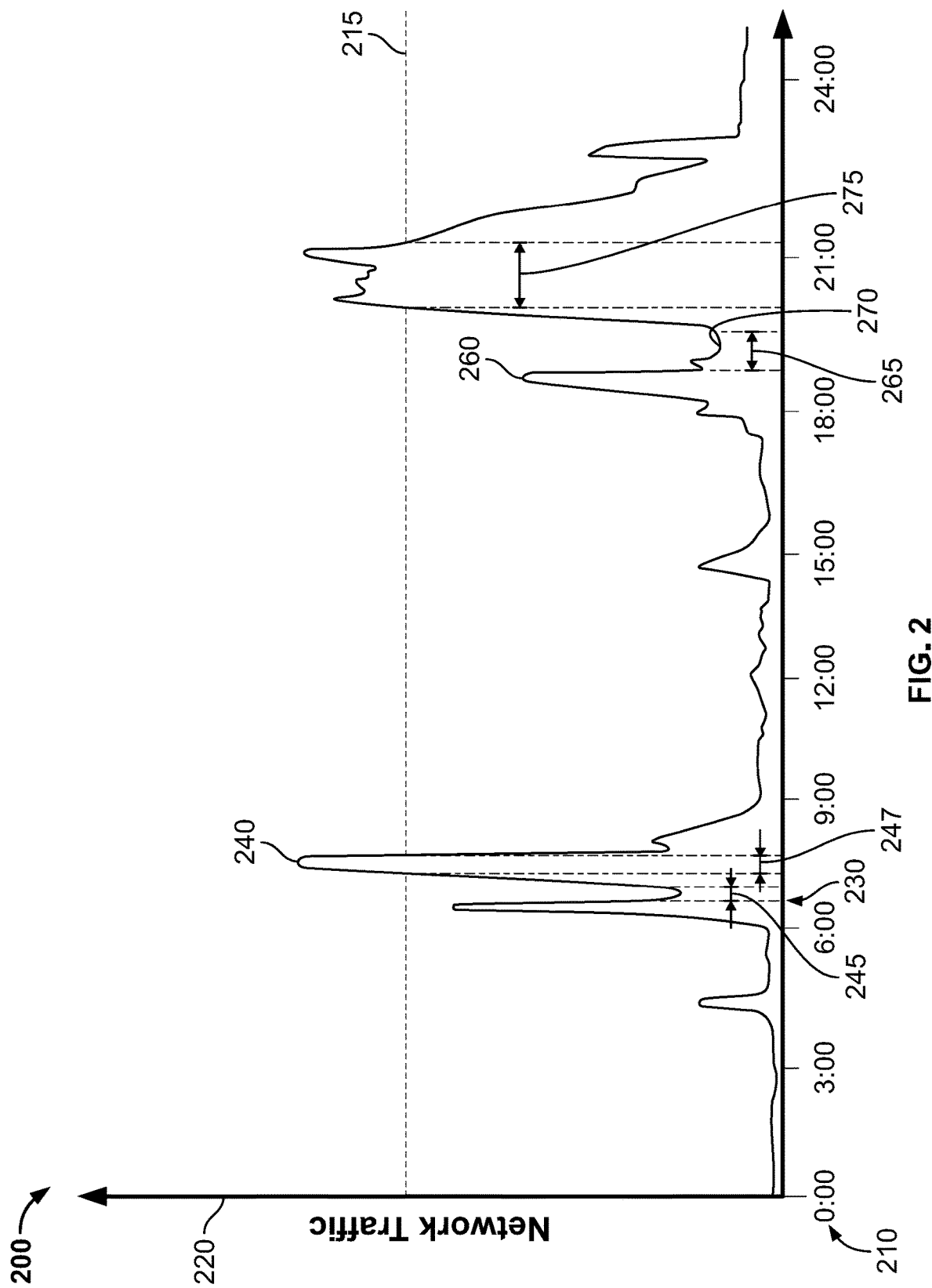
FIG. 2 shows an illustrative example of a network use log in accordance with some embodiments of the disclosure.

At step 804, the media guidance application, using, for example, using control circuitry 604, predicts a capacity of a network for receiving the media asset at the future time based on historical use data for the network. A network for an organization or household may have a network use log that shows historical use data for the network. The historical use log may be one such as shown in FIG. 2, and may include information about use of the network, traffic, users using the network, types of uses of the network, sources and destinations for traffic over the network, time for network uses, and other information about the network. The media guidance application may review the typical uses of the network at a prior occurrence of the future time that the media asset is to be delivered. For example, for a media asset that is needed on Wednesday at 8:30 pm, the media guidance application may review the network use log for network uses on prior Wednesdays or weekdays at the same time and use that information to predict a capacity of the network at the future time. The media guidance application may also consider recent network patterns to determine if there are any anomalous uses that may affect the prediction.

At step 806, control circuitry 604 may calculate a bandwidth volume needed for downloading or pre-caching the media asset. The media guidance application may obtain the bandwidth information by retrieving metadata about the media asset if available, or analyze prior versions of the media asset, if it is periodic, to calculate the bandwidth volume. At step 808, the control circuitry 604 will determine whether the calculate bandwidth volume exceeds the predicted network capacity. This determination may be a comparison of the predicted capacity and the media asset volume. If the media asset bandwidth volume does not exceed the predicted network capacity, the process 800 ends. In this scenario, the media guidance application may listen for another indication of interest in another media asset to download.

If, however, the calculated bandwidth does exceed, the predicted capacity at step 808, the control circuitry 604 may listen for signals from a receiver. At step 810, a receiver, such as receiver 120 (FIG. 1) may monitor a household or organization associated with the network. The receiver may receive audio signals or digital signals from the household or organization. The receiver can be a standalone device that is in communication with the media guidance application, or can be integrated as part of the media guidance application or user equipment 702, 704 and 706 (FIG. 7). The receiver is capable of continuously or periodically monitoring the household. The receiver can also monitor the household by a signal activation where an activity signal exceeds a baseline of activity signals. At step 812, the receiver may detect a signal indicating an activity of a member of the organization. For example, the receiver may detect that a user in a household is setting dishes at the table, or that a user is cooking using an audio signal that relates to the activity. In another example, the receiver may detect that a member of the household may be starting a shower, taking out the garbage, taking a pet for a walk, or other activity that may cause a sound to be emitted. In another example, the receiver may receive a signal to download a recipe or cooking video which the user may use while cooking.

At step 814, control circuitry 604 may determine that the signal detected by the receiver is for an activity that is associated with a reduction in use of the network. The media guidance application may compare the signal information to signal event details, such as those in signal log 300 (FIG. 3) and using network use data 200 (FIG. 2), may determine whether the signal is related to a decrease in network use. In some embodiments, the media guidance application may consult a database of signals, for example, audible signals to compare the received signal to determine information about the received signal. The database may include details about types of activities associated with the signal as well as times associated with the activities, correlations of behaviors, and network uses in conjunction with the activity.

At step 816, the control circuitry 604 may then predict a time period for the activity using historic activity data or information from the database of signals. For example, the media guidance application may analyze a signal log 300 (FIG. 3) to identify prior occurrences of the signal and using the time data, compare network uses and times using the network log data 200 (FIG. 2) to predict a time period for the activity. For example, when a sound of dishes being set on a table is received, it may indicate that there will be a twenty minute lull in network use. The sound of the dishes may have a different average lull time for an evening meal, than a morning or afternoon meal. In another example, the sound of water coming out of a faucet following the dishes setting sound may indicate that a member of the household is washing dishes, and that may be associated with a relatively short period of lower network use. In another example, the media guidance application may consult a database of signal information to determine an average time associated with the signal.

At step 818, the control circuitry 604 may determine a network availability for the predicted time period. The network availability determination for the predicted time period may be made based on historic network use data. For example, a network use log 200 (FIG. 2) may provide information about how a network is used during a period following the activity signal, and also average network use for the time period.

If the network availability for the predicted time period for the activity is adequate for downloading the media asset, based on the known bandwidth of the media asset, at step 820, the media guidance application may automatically download to memory the media asset during the predicted time period for the activity, prior to the future time originally associated with the media asset. Thus, the media guidance application can optimize use of the network by pre-caching a media asset of interest to a user at a time prior to the set time for the media asset, and at a time of reduced network traffic using household or organization activity signals. In an example, if a household has a network service that delivers 100 Mbps and high use periods typically have 70-80 Mbps traffic patterns. For a media asset, such as a movie, that is 5000 Mb, the media guidance application may pre-cache all of some content at a period of lower network use, such as when it is 10-20 Mbps.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 8.

Figure 9:
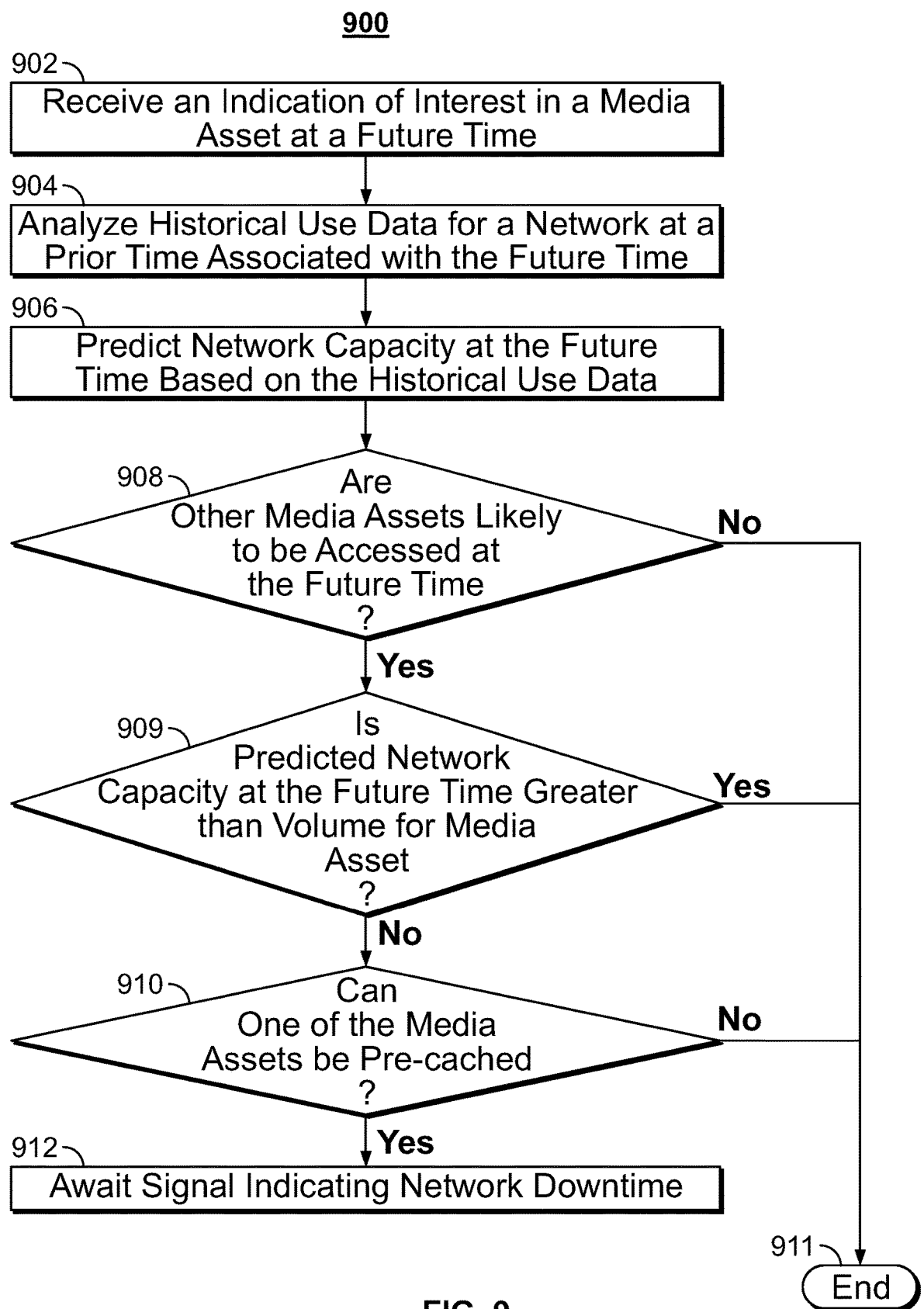
FIG. 9 is a flowchart of an illustrative process for identifying a time to pre-cache a media asset in accordance with some embodiments of the disclosure.

FIG. 9 is a flowchart of illustrative steps of a process 900 for identifying a time to pre-cache a media asset in accordance with some embodiments of the disclosure. It should be noted that process 900 or any step thereof could be performed on, or provided by, any of the devices shown in FIGS. 6-7. For example, process 900 may be executed by control circuitry 604 (FIG. 6) as instructed by a media guidance application implemented on a user device (e.g., user equipment devices 702, 704, and/or 706 (FIG. 7)) in order to pre-cache media assets. In addition, one or more steps of process 900 may be incorporated into or combined with one or more steps of any other process or embodiment described herein.

FIG. 9 shows a process 900 for identifying a time to pre-cached a media asset. At step 902, a media guidance application receives an indication of interest in a media asset at a future time. As mentioned herein, the media asset of interest can be received as a user request for the media asset, and it can be received as a prediction by the media guidance application using a user preference profile. In another example, a user may tag a media asset with a like on social media and that media asset may have some future availability time. In another example, the user may be tagged by a friend on social media with some interesting media that is available at some future time. The media guidance application may seek to optimize delivery of the media asset by analyzing the user's network and members of the network to identify any times that are better for downloading the media asset.

At step 904, the control circuitry 604 may analyze historical use data for the network at a prior time associated with the future time. In this step, the media guidance application may use a network use log (e.g., log 200 (FIG. 2) to analyze network traffic for an earlier occurrence time period for the future time. For example, the media guidance application may consider network traffic for prior weekdays at the future time, on the prior day at the future time, or other occurrence of time that is related to the future time. Using this historic network use data, the media guidance application may predict network capacity at the future time at step 906.

At step 908, the control circuitry 604 may determine whether other media assets are likely to be accessed at the same future time. This determination may be made by reviewing user requests for media at the future time, and/or in addition considering user preference profiles for other members of the household or organization to determine whether there are other media assets that may be sought at the future time. In one example, one member of the household may be streaming a television show series and may have a pattern of viewing at a certain time of day. If the media asset with the future time converges with that certain time of day, there may be a network availability limitations in delivering both media assets simultaneously. A determination is made at step 909 by the control circuitry 604 of whether the network capacity at the future time (e.g., as predicted at step 906) exceeds the volume of the media assets to be delivered at the future time. If there is adequate network capacity at the future time, the process may end at 911. If, however, there is not adequate network capacity at the future time to download the media asset or assets of interest, the media guidance application may analyze the media assets to select one or more for pre-caching.

In that case, at step 910, the control circuitry 604 may determine whether one of the media assets can be pre-cached. If, however, no other media assets are needed at the future time, the process may end. (In some scenarios, however, if no other media assets are needed at the future time, the media guidance application may continue to step 912.) The determination of whether one of the media assets can be pre-cached may involve determining a bandwidth volume necessary for the media assets to be downloaded, and also determining predicted network capacity to perform the download. The determination may involve analyzing network use patterns.

Analyzing network use patterns may also include predicting a number of devices using the network at the future time. The prediction may be based on historic network use patterns. For example, at a relatively heavy use time, network use logs may indicate that five devices are connected and accessing the network. If the same number of devices are expected to be connected to the network at the future time, certain predictions about network use may be made. On the other hand, if the media guidance application determines that one or two fewer devices are connected to the network at a time when more are expected to be connected, the media guidance application may predict that there may be additional network capacity due to the fewer devices.

At step 912, the control circuitry 604 may listen and await an activity signal indicating a network downtime to initiate the download. The activity signal may be received by the media guidance application from a receiver monitoring the household of organization for activities that may be associated with reduced network usage. When a suitable signal is received, the media guidance application may then commence pre-caching the media asset. For example, a media guidance application may identify that an episode of a series being viewed by a user may be downloaded in advance of the time the viewer wishes to view it and can initiate the download automatically when the receiver receives an activity signal that the user is about to sit down for dinner with other members of the organization that are expected to be using the bandwidth at the future time.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 9.

Figure 10:
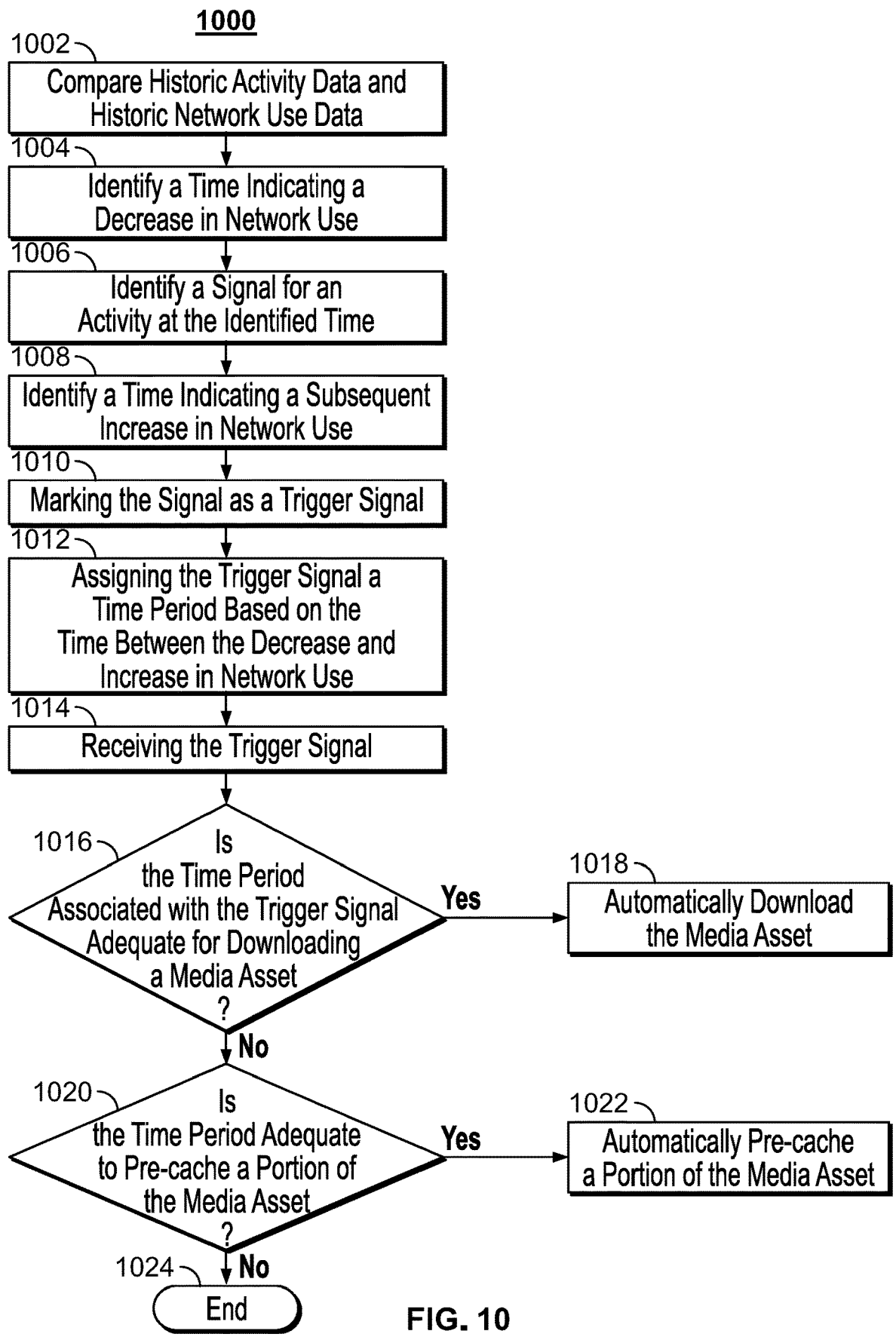
FIG. 10 is a flowchart of an illustrative process for using a signal to initiate pre-caching a media asset in accordance with some embodiments of the disclosure.

FIG. 10 is a flowchart of illustrative steps of a process 1000 for using a signal to initiate pre-caching a media asset in accordance with some embodiments of the disclosure. It should be noted that process 1000 or any step thereof could be performed on, or provided by, any of the devices shown in FIGS. 6-7. For example, process 900 may be executed by control circuitry 604 (FIG. 6) as instructed by a media guidance application implemented on a user device (e.g., user equipment devices 702, 704, and/or 706 (FIG. 7)) in order to pre-cache media assets. In addition, one or more steps of process 1000 may be incorporated into or combined with one or more steps of any other process or embodiment described herein.

FIG. 10 depicts an illustrative process 1000 for using activity data to find a time to pre-cache a media asset. At step 1002, control circuitry 604 may compare historic activity data a historic network use data, such as signal log 300 (FIG. 3) and network log 200 (FIG. 2). For example, the activity data log times may be compared to the network use time to find activity signals that precede and follow changes in network use patterns.

At step 1004, the control circuitry 604 may identify a time indicating a decrease in network use, and at step 1006, the media guidance application may identify a corresponding signal for an activity for the identified time. For example, the media guidance application may identify a time around 7:00 pm in which network use may decrease and find a corresponding signal for the sound of setting dishes on a table at approximately the same time, or at a time preceding the network use change.

At step 1008, the control circuitry 604 may identify a time following the reduced network use period when network use changes again and increases in traffic.

At step 1010, the control circuitry 604 may mark the identified signal for an activity as a trigger signal. The marking by the media guidance application of the signal may be accomplished by recording in memory, characteristics of the signal in, for example, the signal log 300 (FIG. 3). The trigger signal may be used by the media guidance application to identify signals that accompany a reduction in network use.

At step 1012, the control circuitry 604 may assign to the trigger signal a time period based on the time between the decrease and increase in network use. In other words, the time identified at step 1004 and the time identified at step 1008 may be used to calculate a time period for a network lull following the trigger signal. The time period may be recorded in memory by the media guidance application in association with the trigger signal, for example in activity signal log 300 (FIG. 3). The time period associated with the trigger signal can be used to predict network availability for a time following subsequent occurrences of the trigger signal. Multiple signals and trigger signals can be identified by the media guidance application and recorded in a signal log along with characteristics of the signals so that they can be readily identified when they are received at a later time.

At step 1014, the control circuitry 604 may receive the trigger signal. The trigger signal may be received via a receiver (i.e. receiver 120 (FIG. 2)) which may be monitoring a household or organization.

At step 1016, control circuitry 604 can consult the signal log (300 (FIG. 3)) to determine a time period associated with the trigger signal. The media guidance application may determine whether the time period associated with the trigger signal is adequate for downloading a media asset. For example, the time period associated with the trigger signal may be at least thirty minutes and the trigger signal may be associated with a reduction in network bandwidth use of about 10 Mbps.

If the time period is adequate, and knowing the bandwidth needed for media asset, at step 1018, the control circuitry 604 may initiate an automatic download of the media asset. For example, for a 5000 Mb movie, the period to download over a 100 Mbps LAN is approximately 7 minutes. If the predicted time period is greater than 7 minutes, the media guidance application may initiate a download of the media asset.

If, however, the time period is not adequate to complete the download, the control circuitry 604 may determine at step 1020 whether a portion of the media asset can be downloaded. If the time period is adequate for a partial download, the media guidance application may automatically initiate pre-caching of a portion of the media asset. If the time period is not adequate, however, the process may end at step 1024 and the media guidance application may continue to listen for further trigger signals that may be suitable for the download. For example, if the predicted time period is only 5 minutes, the media asset may not be downloaded, or alternatively, some portion of the media asset may be downloaded.

It is contemplated that the steps or descriptions of FIG. 10 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 10.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for optimizing allocation of network bandwidth for pre-caching a media asset, the method comprising:
   receiving, from an interactive media guidance application, an indication of interest in a media asset at a future time;
   predicting, with control circuitry, a capacity of a network for receiving the media asset at the future time based on historical network traffic level data for the network;
   calculating, with the control circuitry, a bandwidth volume for downloading the media asset;
   determining, with the control circuitry, that the calculated bandwidth volume exceeds the predicted network capacity;
   monitoring, with a receiver, an organization associated with the network;
   detecting, with the receiver, a signal indicating an activity of a member of the organization;
   determining, with the control circuitry and based upon the historical network traffic level data for the network, that the activity is associated with a reduction in use of the network;
   predicting, with the control circuitry, based on historic activity data, a predicted time period for the activity;
   determining, with the control circuitry, network availability in the predicted time period, based in part on the historical network traffic level data for the network; and
   automatically, downloading to memory, the media asset prior to the future time and during the predicted time period for the activity.

2. The method of claim 1, wherein receiving from the interactive media guidance application, an indication of interest in a media asset at a future time comprises a user request for the media asset.

3. The method of claim 1, wherein receiving from the interactive media guidance application, an indication of interest in a media asset at a future time comprises identifying the media asset based on a user's history.

4. The method of claim 1, wherein predicting with the control circuitry, a capacity of a network for receiving the media asset at the future time based on historical use data for the network comprises:
   analyzing with the control circuitry, the historical network traffic level data for the network; and
   calculating with the control circuitry, an average capacity for the network at a prior time increment associated with the future time.

5. The method of claim 1, wherein monitoring with the receiver, an organization associated with the network comprises one of the group of: receiving an audio signal from an audio receiver located within audio range of the member of the organization, and receiving a digital signal from a digital receiver associated with a member of the organization.

6. The method of claim 1, wherein the historic activity data comprises data indicating activity signal data and associated time data.

7. The method of claim 1, further comprising:
   determining with the control circuitry, and based upon the historical network traffic level data, that the bandwidth volume exceeds the network availability in the predicted time period;
   receiving from the interactive media guidance application, a second indication of interest in a second media asset associated with the future time;
   determining with the control circuitry, a second bandwidth volume for downloading the second media asset;
   automatically downloading to the memory, the second media asset; and
   scheduling the automatic download of the media asset at the future time.

8. The method of claim 1, further comprising:
   determining with the control circuitry, that the bandwidth volume is substantially near the network availability; and
   pre-caching to the memory, a portion of the media asset in advance of the future time.

9. The method of claim 5, further comprising:
   recording in the memory, the audio signal or the digital signal in association with a time data;
   correlating with the control circuitry, the historical network traffic level data with the time data; and
   identifying with the control circuitry, a pattern of network availability based on the audio signal or digital signal and the correlated network traffic level data.

10. The method of claim 9, further comprising:
    scheduling with the control circuitry, the automatic downloading to the memory, of the media asset based on the pattern of network availability; and
    beginning the automatic download upon receipt of the audio signal or digital signal.

11. A system for optimizing allocation of network bandwidth for pre-caching a media asset, the system comprising:
    input/output (I/O) interface circuitry; and control circuitry configured to:
    receive from an interactive media guidance application, an indication of interest in a media asset at a future time;
    predict a capacity of a network for receiving the media asset at the future time based on historical network traffic level data for the network;
    calculate a bandwidth volume for downloading the media asset;
    determine that the calculated bandwidth volume exceeds the predicted network capacity;
    monitor with a receiver, an organization associated with the network;
    detect with the receiver, a signal indicating an activity of a member of the organization;
    determine, based upon the historical network traffic level data for the network, that the activity is associated with a reduction in use of the network;
    predict based on historic activity data, a predicted time period for the activity;
    determine network availability in the predicted time period, based in part on the historical network traffic level data for the network; and
    automatically, download to memory, the media asset prior to the future time and during the predicted time period for the activity.

12. The system of claim 11, wherein control circuitry configured to receive from the interactive media guidance application, an indication of interest in a media asset at a future time comprises a user request for the media asset.

13. The system of claim 11, wherein control circuitry configured to receive from the interactive media guidance application, an indication of interest in a media asset at a future time comprises identifying the media asset based on a user's history.

14. The system of claim 11, wherein control circuitry predicts a capacity of a network for receiving the media asset at the future time based on historical use data for the network by:
- analyzing the historical network traffic level data for the network; and
- calculating an average capacity for the network at a prior time increment associated with the future time.

15. The system of claim 11, wherein control circuitry configured to monitor with the receiver, an organization associated with the network comprises one of the group of: receiving an audio signal from an audio receiver located within audio range of the member of the organization, and receiving a digital signal from a digital receiver associated with a member of the organization.

16. The system of claim 11, wherein the historic activity data comprises data indicating activity signal data and associated time data.

17. The system of claim 11, wherein the control circuitry is further configured to:
- determine, based upon the historical network traffic level data, that the bandwidth volume exceeds the network availability in the predicted time period;
- receive from the interactive media guidance application, a second indication of interest in a second media asset associated with the future time;
- determine a second bandwidth volume for downloading the second media asset;
- automatically download to the memory, the second media asset; and
- schedule the automatic download of the media asset at the future time.

18. The system of claim 11, wherein the control circuitry is further configured to:
- determine that the bandwidth volume is substantially near the network availability; and
- pre-cache to the memory, a portion of the media asset in advance of the future time.

19. The system of claim 15, wherein the control circuitry is further configured to:
- record in the memory, the audio signal or the digital signal in association with a time data;
- correlate the historical network traffic level data with the time data; and
- identify a pattern of network availability based on the audio signal or digital signal and the correlated network traffic level data.

20. The system of claim 19, wherein the control circuitry is further configured to:
- schedule the automatic downloading to the memory, of the media asset based on the pattern of network availability; and
- begin the automatic download upon receipt of the audio signal or digital signal.

* * * * *